Inventors:
Frank Reingruber
Joseph Reingruber

Patented May 14, 1940

2,201,115

UNITED STATES PATENT OFFICE 2,201,115

AUTOMATIC FLATIRON, AND THERMOSTATIC DEVICE FOR CONTROLLING THE SAME

Frank Reingruber and Joseph Reingruber, Toronto, Ontario, Canada, assignors to General Thermostat Corporation, New York, N. Y., a corporation of New York Application July 7, 1937, Serial No. 152,392
In Canada July 10, 1936

28 Claims. (Cl. 219—25)

Our invention relates to flatirons, more particularly to electrically heated flatirons, and it has for its object the provision of an improved device of this character having improved means for automatically controlling the temperature in the flatiron.

Our invention is an improvement on that shown in our co-pending United States application, Serial No. 24,687, filed June 3, 1935.

A difficulty encountered in thermostatically controlled flatirons is the tendency to "overshoot." That is, the ironing surface gets much hotter when initially heated up than the temperature desired and for which the thermostat is set to operate during use. This is usually caused by the inability of the thermostat employed to follow promptly the rapid rise in temperature in heating up. It is an object of our invention to provide an iron which is not subject to "overshooting."

Another object of our invention is to provide an electric iron with a thermally expansive control which will be simple, of rugged construction and not liable to get out of adjustment during use; which may be cheaply manufactured and calibrated; and which will respond to temperature changes in the iron in such a manner that the working surface is kept within predetermined temperature limits.

Still another object of our invention is to provide an iron with an expansible bar thermostat control which will be readily adjustable for operating in different ranges of temperature of the ironing surface and in which the adjustment control will be located on the outer surface of the iron in an accessible and protected position.

In accordance with this invention, a bar is arranged in good heat conducting relation with the soleplate of the flatiron so as to follow directly temperature changes in the plate. The bar expands and contracts as the soleplate is heated and cooled. A second bar or plate is relatively removed thermally from the soleplate so as to be substantially unaffected by rapid changes in the temperature of the soleplate, but having sufficient thermal contact with the soleplate to follow relatively slow changes in its temperature. A suitable switch for controlling the heating element is operated by the relative expansion and contraction of the two bars. In one form of this invention, the second bar or plate functions as a support for an operating lever for the switch. The lever is engaged by the first bar and as this bar expands and contracts the lever is operated to control the switch.

For a complete understanding of our invention, reference is had to the accompanying drawings in which.

Referring more particularly to Figs. 1 to 4, this invention has been shown as applied to an electrically heated flatiron comprising a soleplate 10 made of cast iron, or other suitable material, such as aluminum. The soleplate 10 is provided on its upper surface with a groove 11 extending from a point towards the front of the iron to near the back. At the rear end the groove 11 has a deeper part 12. In the groove is located a brass bar 13, which is of substantial width and thickness and which is firmly secured to the soleplate at its forward end, leaving the rear end free to move with respect to the soleplate.

Figures 2, 3, 4:
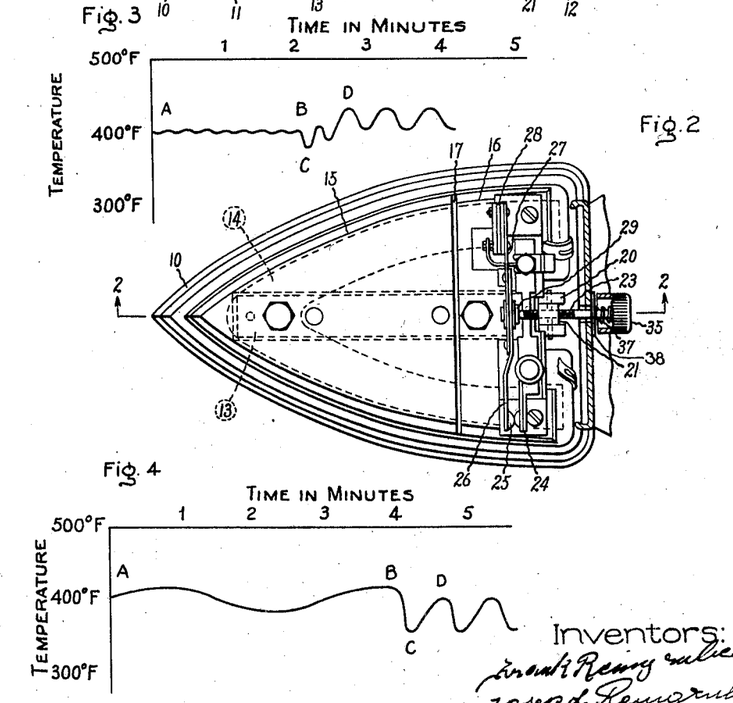
Fig. 2 is a top plan view of the flatiron of Fig. 1 in which the cover plate has been removed.
Figs. 3 and 4 are diagrammatic views illustrating various temperature conditions in the soleplate of this and of the iron of our above-mentioned co-pending application.

A heating element 14 consisting of a ribbon of resistor wire wound on a mica form is on top of the soleplate. The general outline of the resistor heater is shown in Fig. 2 in dotted lines. A pressure plate 15 is on top of the heater element. As shown, the pressure plate consists of two parts, 15 and 16, spaced from one another by a narrow gap 17 and each held in position clamping the heating unit to the soleplate by its individual bolt 18. Layers of mica are provided between the heating resistor and the soleplate and also between the heating resistor and the pressure plate, for the purpose of electrically insulating the heating element from these parts. An opening of larger diameter than the bolt is provided in the brass bar and in the heating element, whereby the bolts 18 perform their function but do not interfere with the expansion of the brass bar.

Figure 1:
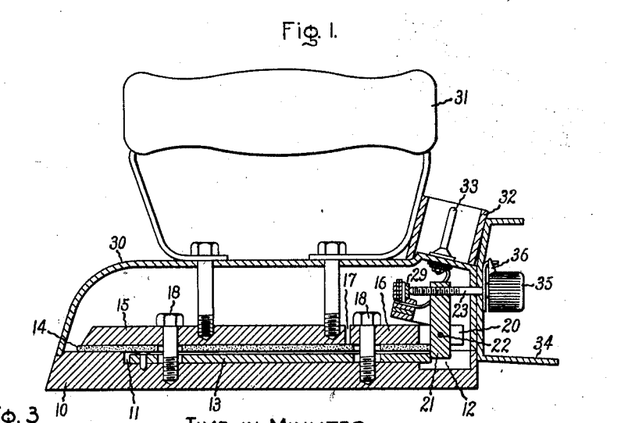
Fig. 1 is a longitudinal vertical central sectional view of an electrically heated iron embodying our invention.

The pressure plate 16 is provided at its rear end with a pair of lugs 20. A lever 21 is pivoted at 22 to the said lugs and has its lower end in engagement abutting against the rear end of the brass bar 13. The upper end of the lever 21 has a threaded opening in which operates a threaded rod 23. A fixed contact 24 is insulatingly supported from the soleplate. A movable contact 25 is mounted on a conducting strip 26. The conducting strip has a spring 27 secured thereto and projecting from the end opposite the contact. The spring is insulatingly secured to the pressure plate at 28. The strip 26 is provided with a bearing block 29 against which bears the end of the threaded rod 23.

The flatiron is provided with a cover plate 30, a handle 31 and the plug guard 32. Insulatingly secured to the cover plate within the plug guard is a pair of terminals 33. At the rear of the iron is a rest 34. The threaded rod 23 projects through an opening in the rear of the casing and rest and is provided on its outer end with a knurled knob 35 and a pointer 36. A coiled compression spring 37 is located between the inner face of the knob and the plate 38 over the opening in the cover plate. It will be apparent that the compression spring 37 will bias the lever 21 so that its lower end will remain in contact with the rear end of the brass bar 13. The threaded rod 23 bears against the bearing block 29 on the strip 26 and it will be apparent that the initial setting of the contacts may be adjusted by turning the knob 35. Suitable indicia, such as "High", "Medium" and "Low", may be applied to the surface in the neighborhood of the pointer 36, whereby an operator is instructed in the adjustment of the iron or the degree of heat being required.

Suitable electric conductors connect the plug terminals of the iron to the heating element and the switch contacts in the customary circuit whereby on the opening of the contacts the circuit through the heating element is shut off and upon the reclosing of the contacts the heating element is reenergized.

In operation: with the iron cold the contacts 24 and 25 will be closed and energy applied to the heating element 14. The heating element transmits heat downwardly into the soleplate 10 and upwardly into the pressure plate 15, 16. The brass bar 13 having an extended surface in contact with the soleplate heats up at the same rate as the soleplate, but having a higher co-efficient of expansion than the soleplate and also the pressure plate, it will for a given change of temperature expand to a greater degree. It will be apparent on an inspection of Fig. 1 that movement of the brass bar 13 to the right will tend to move the lever 21 in a counter-clockwise direction and open the contacts. Any movement of the pivot 22 towards the right, as shown in Fig. 2, would tend to nullify the movement of the bar to the right. Also any movement of the pivot 22 to the left would be additive to the effect of the movement of the end of the brass bar and tend to accelerate the opening of the contacts.

It will be clear that the operation of the contacts depends on the relative movement between the pivot pin 22 and the end of the brass bar 13 and that the pivot pin movement is influenced by the temperature of the pressure plate 16, whereas the brass bar is mainly influenced by the temperature of the soleplate. In ironing operation the lower surface of the soleplate is applied to the work in hand and heat is rapidly abstracted from the surface. Under these circumstances there is a drop in temperature of the soleplate and consequently of the brass bar, whereas the pressure plate 16 will not drop in temperature to nearly as great an extent. The result is that the contraction of the brass bar, due to the drop in temperature, permits the contact 25 to move in to contact with the fixed contact 24, closing the circuit and applying heat to the element. Further heat applied to the element is applied both downwardly to the soleplate and upwardly to the pressure plate, so that continued operation in the manner described the pressure plate will reach a temperature considerably higher than the soleplate.

In our invention the modifying effect of the varying temperature of the pressure plate 16 is different from the modifying effect of a plate extending through a much greater length and held down by a pair of bolts as is the case in our application for patent aforesaid.

We have shown in Fig. 3 a diagram showing the temperature of the soleplate surface during idling and operating conditions of a particular iron in accordance with our prior application referred to in which the pressure plate is in one piece and clamped by a pair of bolts as described, and in Fig. 4 we have shown the temperature of the soleplate surface during idling and under operating conditions for a similar iron to the above but having the construction of our present invention. In the diagrams we have indicated a temperature of 400° F. representing an ironing temperature. Approximately the same conditions would hold for other temperatures within the range customarily employed in ironing.

By an inspection of Fig. 3 it will be observed that during idling, shown in that part of the curve between the points A and B, the temperature drops very little before the heater is connected and the soleplate again brought up to heat. The result is that during idling the soleplate is held very close to a given temperature. On the curve it appears as practically a straight line. The application of heat is to make up for the loss of heat from the iron by radiation and about three breaks a minute take place. When the iron is put to use a large amount of heat is abstracted from the soleplate face and the amount by radiation from the other parts remains approximately the same. When put to use the temperature drops about 25°, to the point indicated by the reference character C. At this point the contacts close and heat is applied to the heating element and the temperature rises to about 10° above the idling temperature. At this point the current is cut off from the element and further abstraction of heat from the surface of the soleplate causes the temperature to drop approximately 25° when the current is again applied to the heating element. The action proceeds as stated and the average temperature climbs as indicated very quickly to a stable condition indicated by that part of the curve to the right of the point D where the current is cut off at about 30° above the idling temperature and the contacts close to apply more current at about the idling temperature.

The temperature curve of a typical example of our present invention of the form shown in Figs. 1 and 2, is shown in Fig. 4. It will be seen that during idling temperature represented between the points A and B the curve has amplitude of about 30° F. between the point where the heat is applied and where it is cut off. This results in much fewer makes and breaks than in the iron of our prior application. When put in use for ironing operations the temperature will drop about 50° as indicated at the point C when the current will again be applied and the temperature will rise to the point D at approximately the average idling temperature. As ironing proceeds the temperature of the soleplate fluctuates between about 50° below the average idling temperature and idling temperature. It is noted that there is no climbing characteristic in this curve. While the operating characteristics described in Fig. 3 are quite satisfactory for ironing purposes, the operating characteristics shown in Fig. 4 eliminate the frequent makes breaks present in the operation of Fig. 3 which might prove troublesome on account of radio interference. On this account and on account of the possible longer life of the contacts due to fewer makes breaks the arrangement of Fig. 4 is preferable.

The above described curves are representative of temperature variations occurring in the operation of the iron described, but are not to be taken as limitations as variation in idling conditions and in working conditions occur. They are representative, however, of the type of control given by the two constructions.

While the bar 13 and the plate 16 have been described as made of brass and iron respectively, it is to be understood that other suitable materials may be used for these members.

Figures 5, 7:
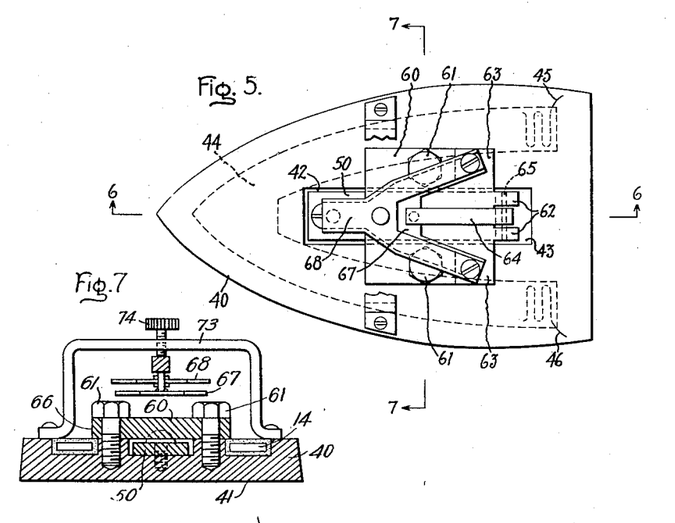
Fig. 5 is a plan view of a flatiron of modified form arranged in accordance with our invention, the cover of the iron being removed.
Fig. 7 is a sectional view taken through the line 7—7 of Fig. 5 and looking in the direction of the arrows.
Figure 6:
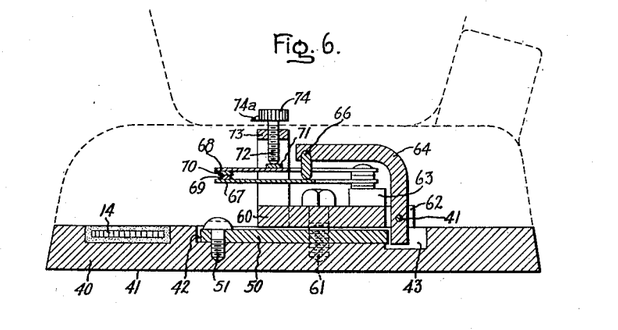
Fig. 6 is a sectional view taken through the line 6—6 of Fig. 5 and looking in the direction of the arrows.

In accordance with the form of our invention shown in Figs. 5, 6 and 7, we provide in a flatiron having a cemented-in heating element, a thermal responsive switch comprising a bar of a metal of relatively high coefficient of expansion, such, for example, as brass, and a plate of a metal of relatively low coefficient of expansion, such as iron. The bar and plate are arranged in differing heat conductive relation to the soleplate, and each is secured directly thereto. A contact operating lever is pivoted on the plate and is arranged to be operated about its pivots by the relative movement of adjacent ends of the bar and plate.

As shown in Figs. 5 to 7, the iron of this form is provided with a soleplate 40 of cast iron or other suitable metal, the surface 41 of which constitutes the ironing surface. In the upper surface of the sole plate is a groove 42 extending along the central axis and provided at its rear end with a deeper portion 43. A heating element indicated by 44 is located in a groove in the soleplate and insulated from the soleplate by cement. The general extent of the heating element is indicated by the dotted line in Fig. 5. The ends of the heating element are brought out at 45 and 46, as indicated in Fig. 5.

In the groove 42 is located a flat bar 50 of metal such as brass having a relatively high coefficient of expansion. The bar 50 is of substantial width and thickness, as shown, and the forward end is firmly secured to the soleplate by the bolt 51. The bottom of the bar rests on the soleplate and is in good heat conducting relation thereto, The rear end of the bar slightly overhangs a depression 43. The bar 50 is of somewhat less width than the groove and its sides do not contact the sides of the groove. The bar 50 is also of slightly less thickness than the depth of the groove.

A plate 60 of metal having a relatively low coefficient of expansion such as iron, of substantial thickness as shown is located on the soleplate spanning the groove 42 and is firmly secured to the soleplate by a pair of bolts 61.

As the bar 50 is of less thickness than the depth of the groove the plate 60 is not in contact with the top surface of the bar 50. The rear end of the plate 60 is provided with a pair of spaced lugs 62. A pair of integral bosses 63 rise from the rear corners of the plate. An L shaped operating lever 64 is pivoted at 65 to the lugs. The short end of the lever 64 bears against the rear end of bar 50 while the long end extends forwardly over the plate 60 and is provided at its forward end with a stud 66.

A pair of Y-shaped flat springs 67 and 68 are provided which have the ends of their arms firmly secured to the tops of the bosses 63 but in such a manner that they are electrically insulated from the bosses and from each other. The lower spring 67 carries a contact 69 at its forward end on its upper side which contact cooperates with a contact 70 provided on the lower side of the spring 68. The contacts are preferably made of silver. The space between the arms of the upper spring 68 is somewhat longer than the space between the arms of the spring 67 permitting the stud 66 to bear on the upper surface of the spring 67. The spring 68 is provided on its upper surface with a bearing block 71. An adjusting screw 72 operates in a bracket 73 which is rigidly secured to the soleplate or some other fixed part of the unit. The head 74 of the adjusting screw is provided with a pointer 74a.

In order to more clearly show the mechanism of this form of our invention, we have not shown various parts such as the cover plate, handle, plug receptacle and the like. We have omitted also for the purpose of clarity from Figs. 5, 6 and 7 the electrical connection wires and the like, but have shown them diagrammatically in Fig. 8. In this figure 75 represents a pair of metal prong contacts such as are commonly used in electric irons whereby a source of electric supply may be connected to the iron. A conductor 76 leads from one terminal to the spring 67 and a conductor 77 leads from the spring 68 to the other terminal 75.

It is clear that with the source of supply connected a circuit is completed through the heating element when the contacts 69 and 70 are closed and that the circuit is broken when these contacts are moved apart.

The operation of our invention is as follows: When the iron is cold the contacts 69 and 70 are closed. When the iron is plugged in to a source of supply the heating element supplies heat to the soleplate and to those parts connected to the soleplate. The brass bar 50 receives most of its heat by conduction from its lower surface.

Referring to Fig. 6 it will be apparent that a movement of the bar 50 to the right with respect to the pivot 65 will rotate the lever 64 in a counter-clockwise direction about the pivot 65 and cause the stud 66 to press the spring 67 downwardly and separate the contacts 69 and 70. It will also be apparent that if the pivot 65 moves to the right with respect to the end of the bar 50 that the lever 64 would move in a clockwise direction, that is, in a direction opposite to that previously described and in the reverse direction from that required to separate the contacts.

The relative position of the right hand end of the bar 50 and the pivot 65 for different degrees of heat of the iron will be described with the plane of the bolt 51 as a reference point. On heating up, the right hand end of the brass bar 50 will move to the right an amount determined by the expansion of the brass between the bolt 25 and the right hand end. The pivot pin 65 will also move to the right with respect to the plane of bolt 51 an amount determined by the expansion of the soleplate between the bolt 51 and bolt 61 plus the expansion of the iron plate 60 from the bolt 61 to the pivot pin. The resultant rotation of the lever 64 about its pivot will be determined in accordance with the algebraic sum of the movement of the pivot and of the right hand end of the bar 50. As the coefficient of expansion of brass is greater than that of iron the resultant rotation for a rise in temperature of the parts will be a rotation of the lever 64 counterclockwise to open the contacts. The position of the contact 70 is adjusted so that the contacts will open when the temperature of the soleplate has reached a predetermined degree suitable for ironing. It is also apparent that the operating temperature can be adjusted for the various heats as required by the operator. The pointer 74a on the knob 74 serves as an indicator to enable the operator to set the temperature to the desired point. Suitable indication such as "Low," "Medium" and "High" may be inscribed on any fixed part such as the customary cover of the iron to cooperate with the pointer in giving an indication of the setting.

The arrangement of parts provided in this form of our invention locates the adjusting knob 74 centrally above the iron where it is easily seen and readily accessible for adjustment and where it is protected from damage or accidental maladjustment.

We have described the operation of our thermostat in cutting off the heating current as the temperature of the iron rises to operating temperature. The construction and arrangement of parts provided however gives a modified action when the iron is in use. In use the heat is rapidly abstracted from the lower face of the soleplate and the drop in temperature of the iron plate 60 under this condition lags behind the soleplate. On the other hand, the brass bar 50 has the large area of its lower face in good contact with the soleplate and follows it rapidly. It has been pointed out that the upper face of the brass and its side faces are not in contact with the plate 60 nor the soleplate. This is for the purpose of causing the brass bar to follow the temperature of the lower part of the soleplate and assume a different temperature from the plate 60. The contraction of the brass bar due to the drop in temperature permits the spring 67 to move upwardly and close the contacts and supply heating current to the iron.

The combined effect of the expansion of the plate 60 carrying the pivot pin 65 and of the brass bar 50 have been described in connection with cutting off the current during the heating up of the iron. It will be apparent that in use after the heating up period, the closing of the contacts and the applying of the current due to a drop in temperature of the face of the soleplate will be influenced to a greater degree by the brass bar 50 which follows the soleplate temperature and to a lesser degree by the movement of the pivot 65 than is the case in the heating up action described. The result is that heat is more promptly applied to supply the demands of the working surface of the soleplate.

In accordance with the form of our invention shown in Figs. 9 to 13 we provide a thermostatic unit which is structurally independent of the flatiron so that it can be readily assembled with and removed from the flatiron as a unit. Here the unit comprises a member having a relatively low coefficient of linear expansion, and a member having a relatively high coefficient of linear expansion, the said members being secured together at one end and supporting at their other end a leverage mechanism arranged to open and close a pair of relatively movable contacts in response to the relative longitudinal expansion of the two members. Further, we mount the thermostatic unit on the soleplate of the flatiron in such a manner that the members having differing coefficients of linear expansion respond differently to changes in temperature of the operating face of the soleplate, that is to say, so that the member of high coefficient of linear expansion responds rapidly to changes in temperature of the operating face of the iron while the other member of low coefficient of linear expansion responds relatively slowly thereto.

As shown in Figs. 9 to 12, in this form, the thermal unit has a member 80 having a relatively low coefficient of linear expansion, such for example as a plate of iron. Projecting from one end of the plate 80 is a pair of lugs 81, and an L-shaped lever 82 is pivoted at 83 between the lugs 81, having its short arm 84 extending below the lower surface of the plate 80 and its long arm 85 extending horizontally above plate 80. A member 86 of substantial width and thickness having a relatively high coefficient of linear expansion, such for example as a brass bar is supported beneath the plate 80 with one end secured to plate 80 and its other end engaging the short arm 84 of the lever 82. As shown the left hand end of the bar extends upwardly past the adjacent end of plate 80 and is clamped thereto by means of a screw 87 which passes through an opening in the upward extension 88 of the bar and engages a tapped hole in the plate 80. A spring 87' is located between the plate 80 and the angular extension 88 of the bar 86 and serves to seat bar 86 at all times firmly against the head of the screw 87. The bar 86 is further secured to the member 80 by means of bolts 89 which pass through openings in bar 86 and engage in tapped holes provided in plate 80. The bolts 89 are so adjusted as to hold bar 86 in spaced relation to the lower surface of plate 80 and the tapped holes in plate 80 are countersunk to provide the sockets 90 in which compression springs 91 are located acting to resiliently bias bar 86 away from the lower surface of plate 80. The openings in the bar 86 are made oversize longitudinally with respect to bolts 89 to permit free longitudinal expansion of bar 86 with respect to plate 80 and the opening in the angular extension 88 of bar 86, through which passes the screw 87 is also made oversize in a vertical direction with respect to screw 87 in order to afford bar 86 a limited movement toward or away from the lower surface of plate 80.

Figure 11:
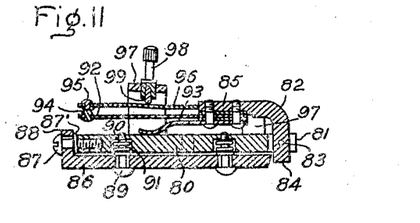
Fig. 11 is a central vertical sectional view of the temperature control device of the flatiron of Figs. 9 and 10 showing the control device removed from the iron.

The long arm 85 of the lever 82 has secured thereto a contact arm 92 and a flat spring 93, which are shown secured to the arm by a pair of bolts. Suitable insulation is provided whereby the contact arm 92 is electrically insulated from the arm 85 and also from spring 93. The contact arm 92 carries an electrical contact 94 on the upper surface of its free end which cooperates with a contact 95 carried by a Y-shaped arm 96, the legs of which are secured to the tops of bosses 97 projecting upwardly from the plate 80 and are electrically insulated therefrom. The flat spring 93 bears at its forward end on the upper surface of the plate 80 and biases the short arm 84 of the lever 82 into contact with the free end of the bar 86. A bracket 97 extending upwardly from the plate 80 bridges the pair of arms 92 and 96, and an adjusting screw 98 carried by the bracket and having an insert 99 of insulating material secured in its end bears on the upper surface of the arm 96.

From an inspection of Fig. 11, the operation of the thermostatic unit described above will be apparent. Expansion of the bar 86 relative to the plate 80 will cause the right hand end of the bar to rotate the lever 82 about its pivot 83 in a counter-clockwise direction against the pressure of the spring 93 to open the contacts. Contraction of the bar 86 relative to the plate 80 permits the spring 93 to move the lever 82 in a clockwise direction to close the contacts. The arm 96 is retrained from upward movement by the adjusting screw bearing on its upper surface, and it is apparent that a change in setting of the adjusting screw will change the position of the contact 95, thus varying the operating range of the thermostatic unit. The bolt 87 and spring 87' permit slight adjustments of the relative longitudinal position of the bar and plate to be made to compensate, in assembling the element, for slight inequalities in the dimensions of the parts.

We have described the plate 80 as made of iron and the bar 86 as of brass. These metals are suitable for the purpose as they are of low cost and have a wide difference in their coefficients of expansion. However, it will be understood that other materials having different rates of expansion may be utilized. It is essential that the materials should also be free from warping and be physically stable at the temperature to which they are subjected. It is also essential that the bar 86 be a good conductor of heat so that it can rapidly follow changes in temperature of the device with which it is placed in contact.

Figures 9, 10, 12:
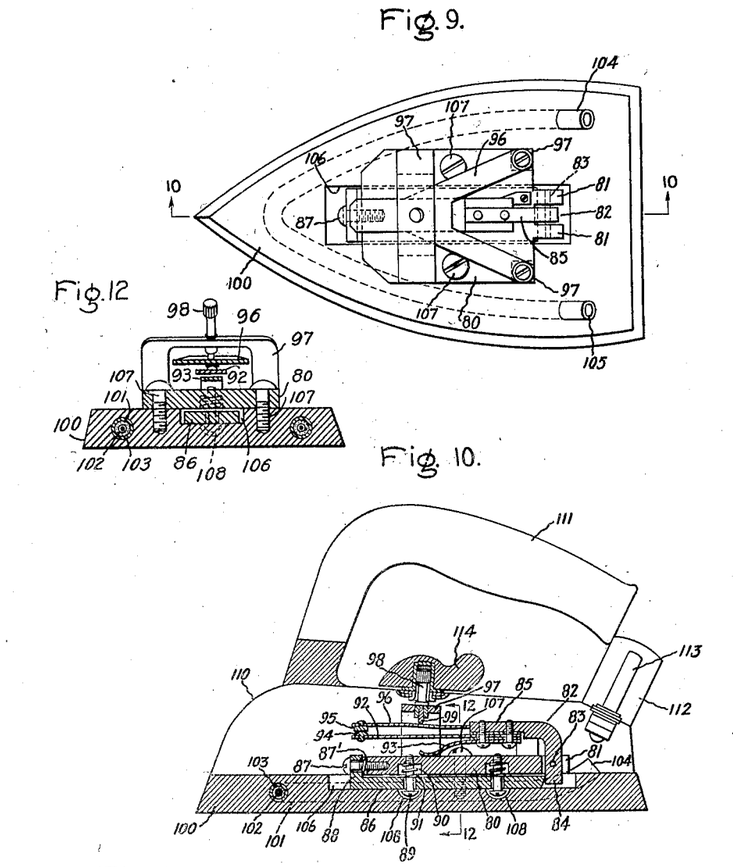
Fig. 9 is a plan view of a flatiron illustrating still another modified form of this invention; the cover of the iron being removed.
Fig. 10 is a sectional view taken through the line 10—10 of Fig. 9 and looking in the direction of the arrows.
Fig. 12 is a sectional view taken through the line 12—12 of Fig. 10 and looking in the direction of the arrows.

Referring now to Figs. 9, 10 and 12, we have shown the thermostatic unit of our invention incorporated in a flatiron in such a manner that the expanding members 80 and 86 of the unit respond differently to changes in temperature of the operating face of the iron.

The soleplate of the iron is designated by the numeral 100 and may be of aluminum or of cast iron and as illustrated has a heating element 101 of the sheathed wire type cast therein, and consisting of a helical resistor 102 centrally located in a metal tube or sheath 103 and electrically insulated from the sheath by compacted magnesium oxide or the like. The terminals of the heating resistor project from the soleplate at 104 and 105 and connections are provided (not shown) for completing the heating circuit for the iron. The upper surface of soleplate 100 is provided with a longitudinal slot 106 dimensioned to receive the bar 86 of the thermostatic unit previously described. The plate 80 spans the slot 106 and the thermostatic unit is secured to the soleplate 100 by the screws 107 passing through suitable openings in plate 80 and engaging tapped holes provided in the soleplate. The screws 107 are located in a plane transverse to the length of plate 80 which is consequently free to expand longitudinally with respect to the soleplate to which it is clamped.

The bottom of slot 106 is provided with suitable recesses 108 to receive the heads of bolts 89 and the depth of the slot 106 is so chosen in relation to the thickness of bar 86 that when plate 80 is clamped to the upper surface of the soleplate 100, bar 86 is slightly lifted from the heads of bolts 89 and is resiliently pressed into firm contact with the bottom of slot 106 by the compression springs 91 located in sockets 90. Moreover the depth of slot 106 and the thickness of bar 86 are such that when the thermostatic unit is clamped to the soleplate, bar 86 is held out of contact with the lower surface of plate 80 by the springs 91. By this arrangement the bar 86 is firmly seated at all points throughout its length on the bottom of slot 106 thus assuring good heat transfer between the bar 86 and the soleplate 100 while the heat transfer between the plate 80 and bar 86 is minimized, by the separation thereof.

The width of the slot 106 is also carefully chosen somewhat greater than the width of bar 86, to adjust the rate of heat transfer across the sides of bar 86. It will be apparent from the relation of bar 86 in slot 106 to the heating element 101 that some heat transfer will occur between the side faces of bar 86 and the sides of slot 106 and it has been found that this heat transfer plays an important part in the operation of the thermostatic unit. If the spacing of the bar 86 from the sides of the slot 106 is made too great, that is, if the rate of heat transfer in this direction is too greatly reduced, we have found that the temperature of the operating face of the iron has tended to "overshoot" i. e. to exceed, on initial heating, the temperature for which the thermostatic unit is set to open its contacts. On the other hand, if this spacing is made too small, that is if the rate of heat transfer in this direction is too great, we have found that the temperature of the operating face of the iron has tended to "undershoot" i. e. to fail to reach the required temperature on initial heating. The proper spacing of the bar 86 in slot 106 is dependent upon the type and relation of the heating element 101 to slot 106, the dimensions of soleplate 100 and bar 86, and can be determined only with respect to a given type of iron. But in every case the proper spacing may be determined which will substantially eliminate both overshooting and undershooting.

The dimensions of plate 80 and its heat transfer relation with the soleplate also have an important bearing on the operation of the thermostatic unit. During the initial heating of the soleplate to its desired temperature it is desirable that the plate 80 attain its maximum expansion in order to avoid a gradual rise in the cutout temperature during continued use of the iron. At the same time, in order to avoid too rapid opening and closing of the movable contacts, it is desirable to have a fixed differential between the contact opening and contact closing temperatures. These aims are accomplished in this embodiment, by suitably dimensioning the plate 80 and by locating it in good heat contact with the soleplate 100 over a limited area only and at a point relatively remote from the operating face of the soleplate. Since, during operation, the plate 80 is ordinarily at a temperature somewhat higher than that of the bar 86, it is necessary to space the bar 86 from the plate 80, as has been pointed out above, in order to minimize the heat transfer from plate 80 to bar 86.

We have shown more or less diagrammatically in Fig. 10 a cover 110 such as is customary in electric irons and which is secured to the soleplate in any suitable manner, a handle 111 and a plug guard 112 which surrounds a pair of terminals 113 one of which is shown whereby the iron may be connected by the customary heater plug to a source of electric supply. The upper end of the adjusting screw projects through an opening in the cover plate and has removably but non-rotatably secured thereto a knob 114. Suitable indicia may be applied to the cover in the neighborhood of the knob whereby the operator may be guided in adjusting the contact 95 to select the degree of heat required for the operation in hand.

Figure 8:
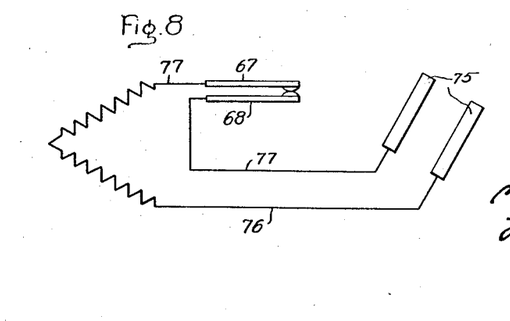
Fig. 8 is a diagrammatic view showing the electrical connections of the flatiron in Figs. 5, 6 and 7.

In Figs. 9 to 12 the electrical connections between the various parts have not been shown, but they are the same as have been shown diagrammatically in Fig. 8.

When the iron is cold and the heating circuit thereof is first connected to a source of electrical supply, the movable contacts of the thermostatic unit are closed as illustrated in Fig. 10. As indicated above the dimensions and heat contact of plate 80 with soleplate 100 are such that during the initial relatively gradual heating of the iron the plate 80 attains substantially its maximum temperature, and consequently expansion, when the iron reaches its desired operating temperature. At this temperature the relative longitudinal expansions of bar 86 and plate 80 operate to open the contacts 94 and 95 to shut off the heating current. If the iron is allowed to cool gradually, as for example by dissipation of heat by radiation and conduction to the surrounding atmosphere during idling the contractions of plate 80 and bar 86 operate to again close the contacts 94 and 95. If the iron is allowed to continue to idle the thermostatic unit continues to alternately open and close the contacts 94 and 95 at substantially regular intervals, the differential in temperature, that is, the difference between the opening and closing temperatures being determined mainly by the dimensions and heat contact of the plate 80 with the soleplate 100.

During operating conditions however when the temperature of the soleplate is suddenly reduced by a sudden heat drain encountered for example when the soleplate is placed in contact with a damp cloth, the temperature of the bar 86 follows closely the temperature of the operating face of the soleplate, whereas the temperature of the plate 80 responds relatively slowly thereto. Consequently, the bar 86 rapidly contracts while the position of pivot 83 on plate 80 remains substantially fixed. Under these conditions the contacts 94 and 95 are quickly closed to supply current to the heating element, to again raise the temperature of the soleplate.

A change in the setting of the adjusting screw 98 controlled by the knob 114 to raise the desired operating temperature of the iron merely delays the opening of the thermostat contacts 94 and 95, thereby permitting the heating element 101 to raise the temperature of the soleplate 100 and plate 80. It is important that plate 80 be so designed as to mass and heat relation to the soleplate that, whenever the desired operating temperature of the iron is changed by changing the adjusting of contacts 94 and 95, the plate 80 attains its maximum temperature for that setting substantially in the same time as the soleplate requires to attain the new desired operating temperature. Otherwise, it has been found that the automatically controlled iron has a rising temperature characteristic, that is to say, the temperature at which the contacts separate gradually rises after the initial cutout until a fixed cutout temperature is reached.

In the form of our invention shown in Figs. 13–16 inclusive, the temperature control device comprises a relatively thin base plate 120 which is adapted to be secured into intimate thermal relation with the soleplate 121 of the iron to which the temperature control device is applied by means of bolts 122. In this case the plate 120 rests directly upon the top of the soleplate, as clearly shown in Figs. 13 and 14.

Figure 13:
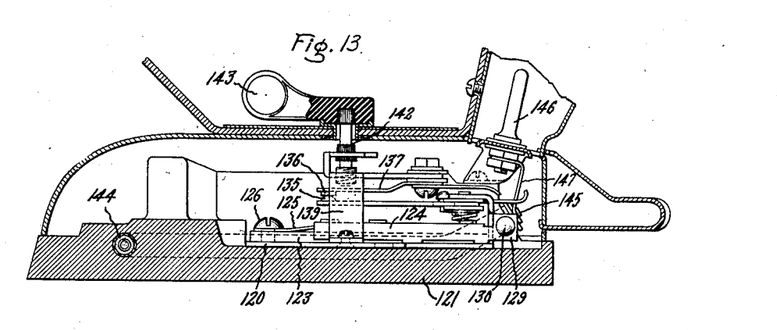
Fig. 13 is a vertical central sectional view of a flatiron illustrating still another modified form of this invention.
Figures 14, 15, 16, 17, 18:
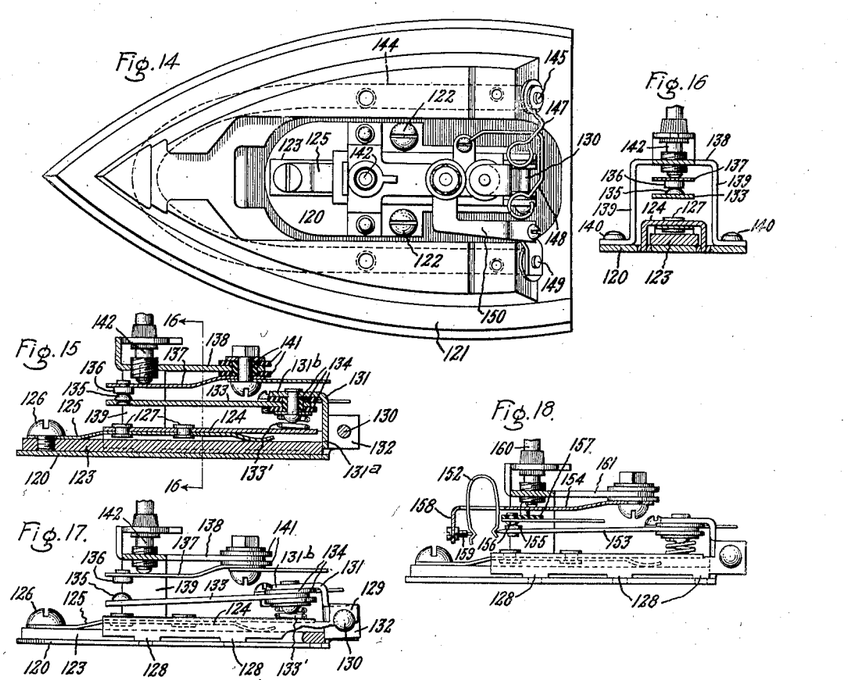
Fig. 14 is a plan view of the flatiron of Fig. 13 with the cover removed so as to illustrate certain details of construction.
Fig. 15 is a vertical elevation in section illustrating the temperature control device used in the iron of Figs. 13 and 14.
Fig. 16 is a sectional view taken through the lines 16—16 of Fig. 15 and looking in the direction of the arrows.
Fig. 17 is a side elevation of the control device of Figs. 15 and 16, with parts in section to illustrate details of construction.
Fig. 18 is a side elevation of a modified form of control device having a snap action switch arranged in accordance with this invention.

Mounted upon the top of the plate 120 is a bar 123 formed of a material having a relatively high coefficient of expansion, such as brass. Also mounted upon the top of the plate 120 is an inverted channel-shaped member 124 formed of a material having a relatively low coefficient of expansion, such as iron, arranged over and around the bar 123 but out of direct thermal relation with it, as shown in Fig. 16. One end of the bar 123, the lefthand end, as viewed in Figs. 13–15 and 17, is secured to the corresponding end of the top wall of the channel-shaped member 124 by means of a strip of spring material 125 which has one end secured to the bar 123 by means of a screw 126 and is secured at a point intermediate its ends to the member 124 by rivets 127. The righthand end of spring strip 125 is bent downwardly as shown in Figs. 16 and 18 to resiliently bias the bar 123 away from the top of the member 124 and into intimate contact with the plate 120. The channel shaped member 124 has limited thermal engagement with the plate 120 by means of a plurality of spaced feet 128 that are rigidly secured to the plate 120 in any suitable manner, as by welding. The right hand end of the channel member 124, as viewed in the drawing, is provided with a pair of spaced lugs 129 which support a pin 130. Mounted upon this pin 130 is an L-shaped member 131 having lugs 132 directly pivoted on the pin. One arm 131a of the L-shaped member extends downwardly so as to be engaged by the bar 123 while the other arm 131b supports a switch arm 133. Interposed between the switch arm and the member 124 is a compression spring 133' biasing the switch arm upwardly. The arm 133 is insulated from the arm 131b by means of insulating sheets 134 formed of any suitable electrically insulating material, such as mica. The arm 133 carries on its free end a contact 135 which cooperates with a contact 136 mounted on a spring arm 137. The arm 137 is mounted upon a bracket 138 which has depending legs 139 that are rigidly secured to the plate 120 in any suitable manner, as by rivets 140. As shown, the arm 137 is electrically insulated from the bracket 138 by means of electrically insulating pieces 141 formed of a suitable material, such as mica. An adjusting screw 142 is mounted on the bracket and bears upon the upper surface of the spring arm 137. Mounted on the outside of the arm is an adjusting knob 143 secured to the screw 142.

The soleplate 121 is heated by an electric heating element 144 of the same character as the heating element 101 of the preceding form of this invention described. One terminal 145 of this heating element is connected to a terminal pin 146 by means of a conductor 147, the opposite terminal 146 of which is connected by means of a conductor 148 with the switch arm 133. The switch arm 137 is electrically connected with the opposite terminal 149 of the heating element by means of a conducting strip 150.

The form of this invention operates in substantially the same manner as the preceding forms. In this case, the bar 123 is in intimate thermal relation with the soleplate of the iron through the supporting plate 120, whereas the upper plate 124 is relatively removed thermally from the soleplate having contact with it only through the relatively small feet 128. Thus, in the heating up of the iron, the plate 124 expands and is heated at substantially same rate as the soleplate to move the pivot 130 toward the right, but in ironing the plate 124 has little influence on the operation of the control except to hold the pivot 130 in its adjusted position at the right, the control under these conditions being effected substantially solely by the expansion and contraction of the bar 123. It will be observed that when this bar expands, it operates the lever 131 about its pivot 130 to open the circuit and when it contracts it permits the lever to close the switch under the influence of the compression spring.

Temperature adjustment is effected by turning the knob 143 which varies the position of the spring 137.

In the form of the invention shown in Fig. 18, the parts are arranged substantially the same as are the corresponding parts of Figs. 13–17 except that in this case a snap action of the switch is provided. This is accomplished by means of a U-shaped compression spring 152 which is interposed between the two switch arms 153 and 154 corresponding respectively to the switch arms 133 and 137 of the preceding form described. Here the switch arm 153 carries a contact 155 which cooperates with a contact 156 mounted on the switch arm 154 and which is supported on the switch arm 154 through the medium of an insulating supporting member 157 which is rigidly secured to the arm 154. The arm 154 in this case has a depending end portion 158 on which is mounted a fixed bearing 159. The spring member 152 has one leg resting on the bearing 159 and its opposite leg bearings on the end of the switch arm 153. Preferably, the legs of the spring will be provided with seats which receive the bearing members respectively, as clearly shown in Fig. 18. Here also, an adjusting screw 160 is mounted in a supporting bracket 161 provided for the upper switch arm 154. The adjusting screw, as before, bears directly on the upper surface of the upper switch arm.

The operation of this form is substantially the same as described in connection with the preceding form except that the spring 152 causes the contacts 155 and 156 to move away from and toward each other with a snap action.

The construction of our invention provides an automatically controlled iron which does not "overshoot," which is quickly responsive to changes in soleplate temperature during operation and consequently prevents an undue drop in soleplate temperature; which is of simple sturdy construction and can be manufactured at low cost, which is easily calibrated and once calibrated is not subject to getting out of order and which is readily adjustable for different ironing temperatures.

An important advantage of the forms shown in Figs. 9 to 12, 13 to 17, and 18 is that the thermostats are assembled as units separate from the soleplate, and operate when assembled with the soleplate independently of the expansion of the soleplate itself.

Another important advantage attained by the use of our invention in its various forms is that the thermostatically controlled iron may be calibrated accurately in a cold condition, thus eliminating a tedious and costly hot calibration stage in manufacture.

While we have shown particular embodiments of our invention, it will be understood, of course, that we do not wish to be limited thereto since many modification may be made, and we, therefore, contemplate by the appended claims to cover any such modifications as fall within the true spirit and scope of our invention.

What we claim as new and desire to secure by Letters Patent of the United States, is:

1. In a flatiron provided with a soleplate, a heating element for said soleplate, means controlling the heating element comprising a pair of expansible and contractible members of widely different coefficients of expansion differentially responsive to the temperature of the soleplate and means operated by the relative movement of said members controlling the operation of said heating means.

2. An electrically heated flatiron comprising a soleplate, an electric heating element for said soleplate, a metallic bar having a relatively high coefficient of expansion in good heat conducting relation with said soleplate arranged to expand and contract as the soleplate heats and cools, a relatively small plate relatively removed thermally from said plate so as to be substantially unaffected by rapid changes in temperature of said plate, and a switch operated by the differential expansion and contraction of said bar and plate controlling said heating element.

3. In a flatiron having a soleplate and means for heating said soleplate, a temperature control device for said heating means comprising a metallic bar having a different coefficient of expansion than said soleplate in good heat conducting relation with it, and free to expand and contract with relation to the soleplate, a relatively small metallic plate having a low coefficient of expansion compared with that of said metallic bar relatively removed thermally from said soleplate so as to be substantially unaffected by rapid changes in the temperature of said soleplate, and means operated by the relative expansion and contraction of said bar and plate controlling the operation of said heating means.

4. In a flatiron having a soleplate and means for heating said soleplate, a temperature control device for said heating means comprising a memetallic bar having a different coefficient of expansion than said soleplate in good heat conducting relation with it, and free to expand and contract with relation to the soleplate, a relatively small metallic plate having a low coefficient of expansion compared with that of said metallic bar relatively removed thermally from said soleplate so as to be substantially unaffected by rapid changes in the temperature of said soleplate and a switch operated by the differential expansion and contraction of said metallic bar and plate controlling said heating means.

5. In an electric flatiron, a soleplate, an electric heating means therefor, a stationary contact and a movable contact in the current connection for said heating means, and temperature responsive means for operating said movable contact comprising a bar of metal of different coefficient of expansion than said soleplate and in good heat conducting relation therewith, said bar being fixed at one end and free to expand longitudinally, a plate of metal of relatively short length compared to said bar located above said bar so as to be little affected by rapid temperature changes of the working face of said soleplate, and a lever pivoted to said plate and actuated by the free end of said bar to operate the contacts.

6. In an electric flatiron, a soleplate, an electric heating means therefor, a stationary contact and a movable contact in the current connection for said heating means, and temperature responsive means for operating said movable contact comprising a bar of metal of different coefficient of expansion than said soleplate and in good heat conducting relation therewith, said bar being fixed at its forward end to said soleplate and extending substantially to the rear thereof, a plate of metal of relatively short length compared to said bar located above said bar at the rear of said plate and so as to be relatively unaffected by quick temperature changes in the working face of said soleplate, a lever pivoted to said plate and actuated by the free end of said bar, and an operable connection between said lever and contacts.

7. In an electric flatiron, a soleplate, an electric heating means therefor, a stationary contact and a movable contact in the current connection for said heating means, and temperature responsive means for operating said movable contact comprising a bar of metal of different coefficient of expansion than said soleplate and in good heat conducting relation therewith, said bar being fixed at one end and free to expand longitudinally, a pressure plate over said heating means divided into a plurality of separated sections, means securing each of said sections to said soleplate, and a lever for operating said contacts pivoted to one of said sections and actuated by the free end of said bar.

8. In an electric flatiron, a soleplate, an electric heating means therefor, a stationary contact and a movable contact in the current connection for said heating means, and temperature responsive means for operating said movable contact comprising a bar of metal of different coefficient of expansion than said soleplate and in good heat conducting relation therewith, said bar being fixed at one end and free to expand longitudinally, a flat heating element lying on said soleplate, a pressure plate lying on said heating unit, the heating element electrically insulated from said soleplate and said pressure plate by sheets of material of poor heat conductivity relative to metal, said pressure plate consisting of two parts, slightly spaced apart longitudinally of said iron, and each part separately secured to said soleplate, a lever pivoted to one part of said pressure plate and having an arm actuated by the free end of said bar to operate the contacts.

9. In an electric flatiron, a soleplate, an electric heating means therefor, a stationary contact and a movable contact in the current connection for said heating means, and temperature responsive means for operating said movable contact comprising a bar of metal of different coefficient of expansion than said soleplate and in good heat conducting relation therewith, said bar being fixed at one end and free to expand longitudinally, a plate of metal of relatively short length compared to said bar located above said bar so as to be little affected by rapid temperature changes of the working face of said soleplate, thermal insulating material between said plate and said soleplate and a lever pivoted to said plate and actuated by the free end of said bar to operate the contacts.

10. In a flatiron, a soleplate, an electric heating means for said soleplate, a stationary contact and a movable contact in the current connection for said heating means, and temperature responsive means for operating said movable contact comprising a bar of metal of higher coefficient of expansion than said soleplate and in good heat conducting relation with said soleplate, said bar being fixed at one end and free to expand and contract longitudinally, a piece of metal of low coefficient of expansion spanning said bar and in contact with the soleplate on each side thereof but not in contact with said bar, the said plate being fixed to said soleplate at one point longitudinally thereof, a lever pivoted to said plate and having one arm located to be actuated by movement of the free end of said bar and another arm arranged to move said movable contact.

11. In a flatiron, a soleplate, an electric heating means for said soleplate, a stationary contact and a movable contact in the current connection for said heating means, and temperature responsive means for operating said movable contact comprising a bar of metal of higher coefficient of expansion than said soleplate and in good heat conducting relation with said soleplate, said bar being fixed at one end and free to expand and contract longitudinally, a piece of metal of low coefficient of expansion spanning said bar and in contact with the soleplate on each side thereof but not in contact with said bar, the said plate being fixed to said soleplate at one point longitudinally thereof, an L-shaped lever having one arm extending over said plate and arranged to actuate said movable contact, and its other arm pivoted to the plate and positioned to be engaged by said free end of said bar.

12. A flatiron comprising a soleplate, electric heating means for the soleplate, the soleplate having a longitudinal groove, a flat metallic bar having a relatively high coefficient of expansion resting on the bottom wall of the groove in good thermal relation with the soleplate and being free to expand and contract as the plate heats and cools, a metallic plate having a relatively low coefficient of expansion spanning said groove and having limited thermal contact at its edges with the soleplate, and means operated by the differential expansion and contraction of said bar and plate controlling said heating means.

13. A flatiron comprising a soleplate, electric heating means for the soleplate, the soleplate having a longitudinal groove, a flat metallic bar having a relatively high coefficient of expansion resting on the bottom wall of the groove in good thermal relation with the soleplate and being free to expand and contract as the plate heats and cools, a metallic plate having a relatively low coefficient of expansion spanning said groove and having limited thermal contact at its edges with the soleplate, a pair of switch blades secured to said metallic plate, cooperating contacts carried by said blades, and means for actuating one of said blades responsively to the differential expansion and contraction of said metallic bar and plate.

14. In an electric iron the combination of a soleplate, an electric heating means therefor, a thermostatic unit for opening and closing the circuit of said heating means, said unit including a pair of members having differing coefficients of linear expansion and a pair of contacts actuated solely by the change in length of said members relative to each other due to a change in temperature, and means for securing said members in respectively different heat conductive relation to said soleplate whereby they are differently affected by temperature changes of the soleplate.

15. In an electric iron the combination of a soleplate, an electric heating means therefor, a thermostatic unit for opening and closing the circuit of said heating means, said unit including a member of relatively low coefficient of linear expansion, a member of relatively high coefficient of linear expansion, said members being secured together adjacent one end thereof, a pair of relatively movable contacts, and a leverage mechanism mounted on one of said members responsive to the change in length of said members relative to each other due to a change in temperature and adapted to actuate said contacts, and means for securing said members in respectively different heat conductive relation to said soleplate whereby they are affected differently by temperature changes of the soleplate.

16. In an electric iron, the combination of a soleplate having a groove in the upper surface thereof, an electric heating means for said soleplate, a thermostatic unit for opening and closing the circuit of said heating means, said unit including a member of relatively low coefficient of linear expansion, a member of relatively high coefficient of linear expansion secured to said first named member at one end thereof, and a pair of contacts actuated solely by the change in length of said members relative to each other due to a change in temperature, and means for securing said unit to said soleplate with said first named member in heat conductive contact with the upper surface of said soleplate, and with said second named member in heat conductive contact with the bottom of said groove, whereby said members are affected differently by temperature changes of said soleplate.

17. In an electric iron, the combination of a soleplate having a groove in the upper surface thereof, an electric heating means for said soleplate, a thermostatic unit for opening and closing the circuit of said heating means, said unit comprising a plate, a bar of material having a higher coefficient of linear expansion than that of said plate, said bar being secured at one end to an end of said plate in spaced relation to the lower surface thereof, and means whereby longitudinal movement of the other end of said bar relative to the other end of said plate due to changes of temperature actuates circuit controlling contacts, and means for securing said plate to said soleplate whereby said plate is secured in limited heat conductive contact therewith, and said bar is held in good heat conductive contact with the bottom of said groove.

18. In an electric iron, the combination of a soleplate having a groove in the upper surface thereof, an electric heating means for said soleplate, a thermostatic unit for opening and closing the circuit of said heating means, said unit comprising a plate, a bar of material having a higher coefficient of linear expansion than that of said plate, means for securing said bar at one end to an end of said plate whereby said bar is held against bodily longitudinal movement with respect to said plate while permitting a slight movement of said bar toward or away from the lower surface of said plate, spring means interposed between said bar and said plate whereby said bar is resiliently biased away from the lower surface of said plate, means whereby longitudinal movement of the free end of said bar relative to the free end of said plate due to changes in temperature actuates circuit controlling contacts, and means for securing said plate to said soleplate whereby said plate is held in limited heat conductive contact therewith, and said bar is resiliently biased into good heat conductive contact with the bottom of said groove.

19. An automatic electric iron comprising in combination a soleplate, a heating element therefor, and a thermostatic unit including a pair of contacts connected in series circuit with said heating element, said unit comprising a pair of members of materials having differing coefficients of linear expansion, said members being secured together at one end, and means mounted on one of said members and operated by the relative longitudinal expansion and contraction of said members to open and close said contacts, said members being arranged in heat conductive relation to said soleplate whereby each responds differently to changes in temperature of said soleplate, one of said members being dimensioned and having such heat conductive relation to the soleplate that it responds relatively slowly to changes in temperature thereof, and the other of said members being arranged in such heat conductive relation to the operating face of said soleplate that it responds relatively rapidly to changes in temperature thereof.

20. An automatic electric iron comprising in combination, a soleplate having a groove in the upper surface thereof, a heating element for said soleplate, and a thermostatic unit secured to said soleplate and including a pair of contacts connected in series circuit with said heating element, said unit comprising a member having a relatively low coefficient of linear expansion, a member having a relatively high coefficient of linear expansion secured at one end to an end of said first named member, and means mounted on one of said members and operative in response to thermal relative longitudinal expansion and contraction of said members for opening and closing said series circuit, said first named member being mounted on said soleplate in heat conductive contact therewith on either side of said groove, said member being dimensioned as to width, length, and mass whereby it responds relatively slowly to temperature changes of said soleplate and whereby it attains its maximum temperature during the initial heating of said soleplate to its operating temperature, and said second named member being located in said groove in extended heat conducting contact with the bottom thereof and spaced from the sides thereof, whereby said second named member responds relatively rapidly to temperature changes of the operating face of said soleplate.

21. A thermostatic switch for electric irons and the like comprising a member of relatively low coefficient of linear expansion, a member of relatively high coefficient of linear expansion, means for securing an end of said second named member to an end of said first named member whereby bodily longitudinal movement of said members relative to one another is prevented but a slight movement of said members toward and away from each other is permitted, resilient means interposed between the lower surface of said first member and the upper surface of said second member, whereby said members are resiliently biased away from one another, a leverage mechanism pivoted on the free end of said first member and having a short arm engaging the free end of said second member and a long arm carrying a movable contact adapted to cooperate with a fixed contact to open and close an electrical circuit, said lever being operative in response to thermal relative changes in length of said members to actuate said movable contact between its open and closed positions.

22. A thermostatic switch for electric irons and the like comprising a member of relatively low coefficient of linear expansion, a member of relatively high coefficient of linear expansion having an angular extension at one end, said second named member being positioned adjacent the lower surface of said first member with said angular extension adjacent an end surface of said first member, said angular extension having an oversize opening therein whereby a screw may be passed therethrough and entered in said end surface of said first member thereby to secure said members against relative bodily longitudinal movement while permitting a slight movement of said second member toward and away from the lower surface of said first member, resilient means interposed between the lower surface of said first member and said second member whereby said members are resiliently biased away from each other, a fixed contact supported on and spaced from the upper surface of said first member, a leverage mechanism pivoted on the free end of said first member and having a short arm engaging the free end of said second member, a movable contact adapted to be actuated by said leverage mechanism into and out of contact with said fixed contact, and resilient means engaging said first member and said leverage mechanism to resiliently bias the short arm thereof into engagement with the free end of said second member, whereby said leverage mechanism is operative in response to thermal relative expansions and contraction of said members, to operate said movable contact into and out of engagement with said fixed contact.

23. A thermostatic switch for electric irons and the like comprising a member of relatively low coefficient of linear expansion, a member of relatively high coefficient of linear expansion secured at one end to said first member at an end thereof, and means mounted on one of said members and operative in response to thermal relative changes in length of said members for actuating a pair of relatively movable contacts between open and closed positions, said members each being dimensioned and positioned with respect to one another that when the switch is incorporated in the device with which it is used, each member responds differently to temperature changes of the part being controlled.

24. A thermostatic switch for electric irons and the like comprising a member of relatively low coefficient of linear expansion, a member of relatively high coefficient of linear expansion secured at one end to an end of said first member, and means mounted on one of said members and operative in response to thermal relative changes in length of said members for actuating a movable contact into and out of engagement with a cooperating fixed contact, said first member being dimensioned with respect to, and arranged to have such limited heat conducting contact with, the temperature controlled part of the device with which the switch is to be used, that said first member responds relatively slowly to temperature changes of said part, and said second member being dimensioned and positioned with respect to said first member, and being arranged to have such extensive heat conducting contact with the said part, that said second member responds relatively rapidly to temperature changes thereof.

25. A thermostatic switch for electric flatirons and the like comprising a thin metallic support adapted to be placed in good thermal relation with the sole plate of the iron, a bar having a high coefficient of expansion mounted on said support for free expansion and contraction and in intimate thermal relation with the support, an inverted channel shaped member housing said bar and having a limited thermal contact with said support, and means operated solely by the relative expansion and contraction of said bar and channel-shaped member controlling the heating element of said iron.

26. A thermostatic switch for electric flatirons and the like comprising a thin metallic support adapted to be placed in good thermal relation with the sole plate of the iron, a bar having a high coefficient of expansion mounted on said support for free expansion and contraction and in intimate thermal relation with the support, an inverted channel-shaped member housing said bar and having a limited thermal contact with said support, a lever mounted on said channel shaped member operated by the relative expansion and contraction of the bar, and switching means operated by said lever controlling the heating element of said iron.

27. A thermostatic switch for electric flatirons and the like comprising a thin metallic support adapted to be placed in good thermal relation with the sole plate of the iron, a bar having a high coefficient of expansion mounted on said support for free expansion and contraction and in intimate thermal relation with the support, an inverted channel-shaped member housing said bar and having a poor thermal contact with said support, a lever mounted on said channel shaped member operated by the expansion and contraction of the bar, a switch arm operated by said lever, a relatively stationary switch arm cooperating with said first switch arm, a spring cooperating with said arms to move them apart and together with a snap action and means operated by said switch arms controlling the energization of the heating element of said iron.

28. In an electric flatiron, a soleplate, an electric heating means therefor, a stationary contact and a movable contact in the current connection for said heating means, and temperature responsive means for operating said movable contact comprising a bar of metal of different coefficient of expansion than said soleplate and in good heat conducting relation therewith, a plate of metal located above said bar so as to be little affected by rapid temperature changes of the working face of said soleplate, a lever pivoted to said plate and actuated by the free end of said bar to operate the contacts, and a spring cooperating with said contacts to move them apart and together with a snap action.

FRANK REINGRUBER.
JOSEPH REINGRUBER.